Jan. 5, 1965 W. B. STEVENS 3,164,305
SPREADING MECHANISM FOR PULVERULENT MATERIAL
Filed Oct. 17, 1962 2 Sheets-Sheet 1

INVENTOR.
WILLIAM B. STEVENS,

BY
ATTORNEYS.

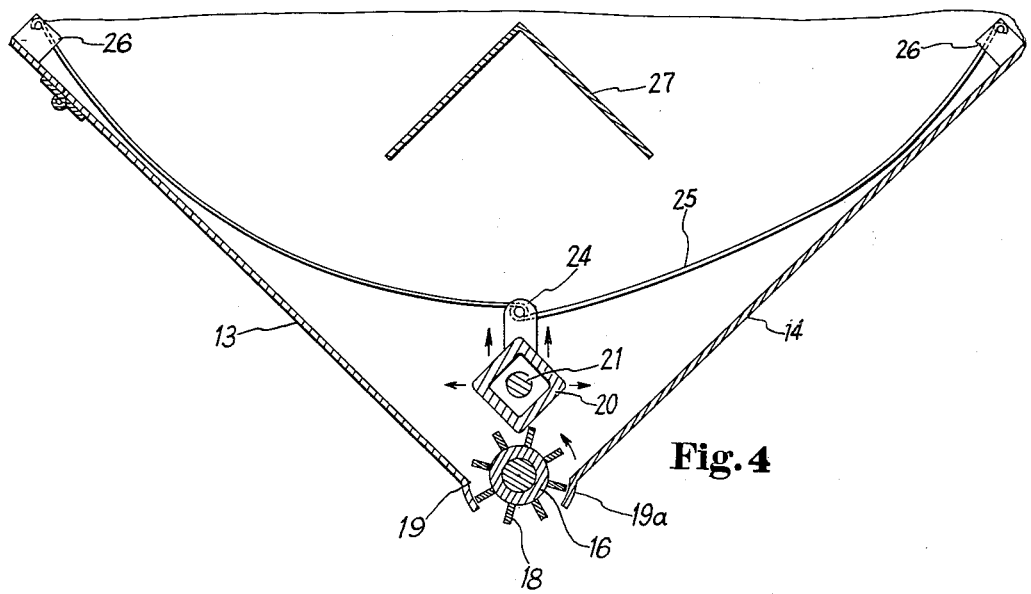
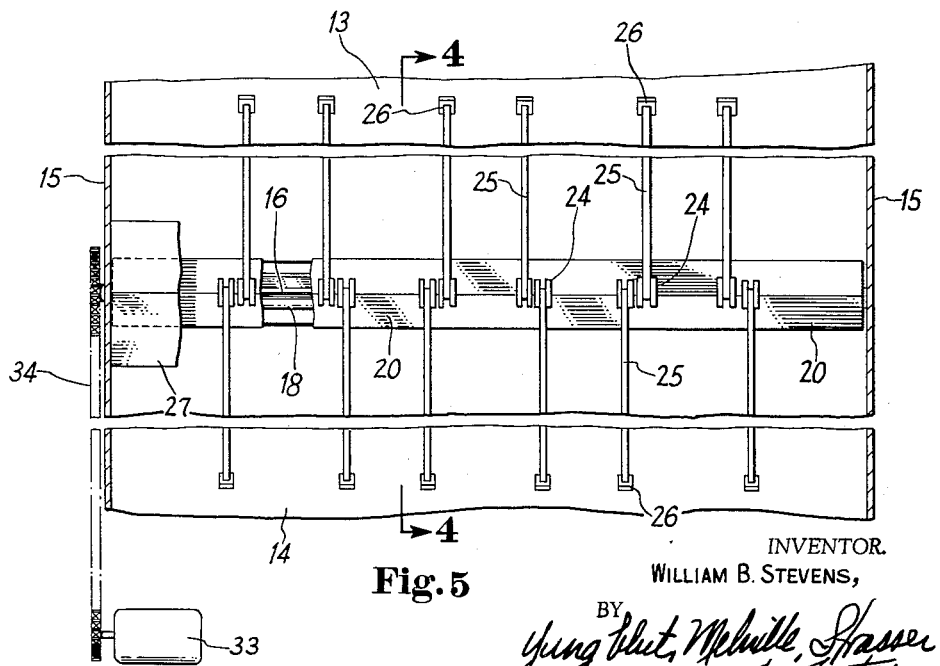

United States Patent Office 3,164,305
Patented Jan. 5, 1965

3,164,305
SPREADING MECHANISM FOR PULVERULENT MATERIAL
William B. Stevens, Terrace Park, Ohio
(1214 E. Rookwood, Cincinnati 8, Ohio)
Filed Oct. 17, 1962, Ser. No. 231,255
6 Claims. (Cl. 222—197)

This invention relates to a mechanical device for spreading carefully metered quantities of cement, sand, gravel, chemicals, and the like, and has particular utility in the construction of soil cement road bases.

It will be understood that in its broadest terms, my invention is applicable to the spreading of any pulverulent material. However, the spreading problems involved in the soil cement process of construction are particularly acute, and hence my description will be couched largely in terms relating to that process. But it should be made clear at the outset that the device of my invention may be used in any field where controlled metering of a pulverulent material is desired.

Soil-cement is a tightly compacted mixture of pulverized soil, Portland cement, and water that, as the cement hydrates, forms a hard, durable, paving material. It is primarily used as a base course for road, street and airport paving. In soil-cement construction, the objective is to mix pulverized soil and cement thoroughly in correct proportions with sufficient moisture to permit maximum compaction. Construction methods generally employ the following steps: (a) The roadway is shaped to its approximate grade, (b) a thin layer of Portland cement is spread over the roadway, (c) this layer of cement is mixed with the underlying soil of the road base, (d) a predtermined amount of water is applied to this mixture, (e) the mixture is compacted and allowed to cure. A bituminous wearing course is then placed on the surface of the finished base to complete the pavement.

While exact data showing the relative proportions of soil and cement are readily available to the skilled worker in the art, the following figures may be used for purposes of illustration. A typical roadway base may have a compacted depth of 6 inches; by volume, the cement will constitute only 8 to 10% of the total mixture. This means that about 30 pounds or one-third of a standard bag of cement must be spread over each square yard of surface area. Accurate metering of the cement over the area under construction is very important, first of all because cement is the expensive component, so that an excess of cement will rapidly increase costs, and secondly, because proper regulation of the amount of cement is essential to securing maximum strength values.

Accordingly, it is a primary object of the instant invention to provide a spreading mechanism which will accurately meter predetermined quantities of a pulverulent material onto a desired surface.

It will also be apparent to one skilled in the art that cement, by its nature, is a material which is rather difficult to spread. This is in large part because the cement is so finely powdered that it tends to cake or bridge in the spreading mechanism, and also because the volume-weight ratio of commercial cement varies so widely. Hence it is another very important object of my invention to provide a spreading machine which will prevent caking or bridging, and which will fluff the material being spread into a substantially homogeneous mixture having a constant volume-weight ratio, and therefore will satisfactorily spread finely powdered materials.

It is also conventional in general construction jobs to separate the hauling and spreading functions. That is, the various materials required are hauled to the job site in any acceptable unit, and then transferred to a spreading device. Therefore, it is still another object of my invention to combine the hauling and spreading functions into a single unit.

Another object of this invention is to provide a spreading device which can be adjusted to handle various gradations of material.

These objects, along with others which will become apparent to the skilled worker in the art as this specification proceeds, are accomplished by the novel construction of my invention. The accompanying drawings illustrate one specific embodiment of my invention, and I shall refer to the drawings hereinafter. The several views may be described as follows:

FIGURE 4 is a vertical cross-sectional view through the spreader of my invention, and may be taken along the line 4—4 of FIGURE 5; and FIGURE 5 is a horizontal view with certain parts broken away for clarity of illustration.

Briefly in the practice of my invention, I provide a hopper terminating downwardly in a dispensing opening which is closed by a vane-like metering shaft which is accurately machined to predetermined dimensions. This shaft rotates with very close clearances past a strike-off bar which serves to control the volume of material moved by the vanes of the metering shaft. I also provide a vibrating tube which is actuated by the rotating metering shaft and which, through a unique construction described in more detail hereinafter, serves the dual purposes of (a) assisting the downward flow of material by preventing caking or bridging of material in the hopper, and (b) serves to fluff up the material being metered so the spreading can be carried out evenly.

Figure 1:
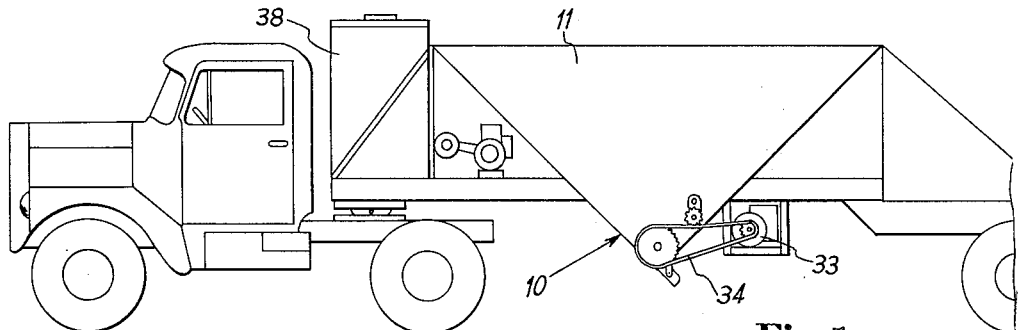
FIGURE 1 is a side view of the preferred form of my invention in which it is an integral part of a bulk hauling unit.
Figure 2:
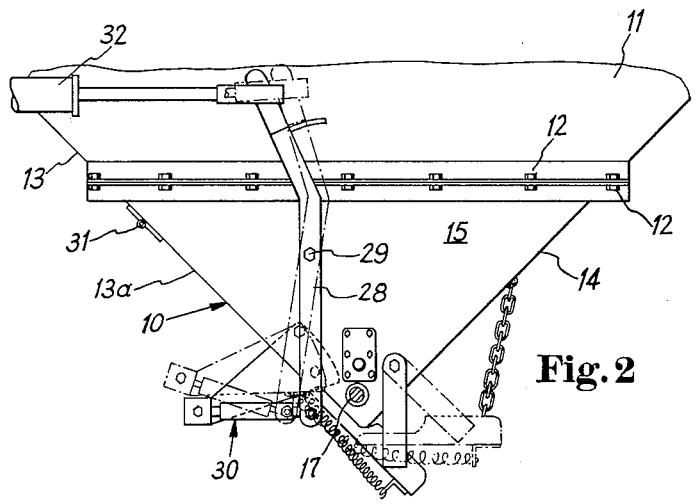
FIGURE 2 is an enlarged view of a portion of FIGURE 1 showing the opposite side of the spreading mechanism, and illustrating the gate control mechanism.

In FIGURE 1, I have shown the preferred embodiment of my invention, in which the spreading mechanism indicated generally at 10 is mounted in the bottom of a hopper 11 of a conventional bulk hauling unit including a prime mover such as a truck tractor. By comparing FIGS. 1 and 2, it may be seen that the spreading mechanism may be formed either as an integral part of the hopper unit, or may be formed as an entirely separate unit and secured to a suitable truncated hopper by means of the bolts 12.

Referring now to FIGS. 4 and 5, I shall describe the functional mechanism of my spreader. The side walls 13 and 14 slope downwardly toward each other to form a V-shaped hopper having a discharge opening at its base; the end walls 15 are shown in FIG. 5 as being vertical, but it will be understood that this construction is not limiting, and that the end walls 15 may also slope downwardly toward each other to produce a smaller opening. For my purposes, however, vertical end walls are preferable in that the hopper may be made as wide as the vehicle or even wider, and full width spreading may be accomplished.

A metering shaft 16 is rotatably mounted at the bottom of the hopper extending between the end walls 15. Suitable bearings 17 (see FIG. 2), will, of course, be provided. The shaft 16 is provided with a plurality of blades or vanes 18. In the accompanying drawings, I have shown eight such blades but this number is in no way a limitation of my invention. It is only important that the blades be spaced an accurate distance apart, and that the radius taken from the center of the shaft to the outermost edge of each blade be carefuly and precisely maintained. To accurately control the quantity of material moved by the metering shaft and the blades 18, I provide a strike-off bar 19; in the embodiment shown in the drawings, the strike-off bar is formed integrally with the side wall 13 of the hopper. In any event, the strike-off bar 19 will be positioned to closely approach the blades 18 with only a very small clearance, and will be of such dimensions that at least one blade 18 will at all times be in contact with it. A similar member 19a is provided on the other side of the discharge opening, so that no material will escape through the discharge opening when the shaft 16 is not rotating. In other words, material contained in the hopper will flow by gravity into the spaces between the blades 18 on the metering shaft 16. As the metering shaft rotates, the strike-off bar will act as a scraper to insure that a constant volume of material is carried between any two blades of the metering shaft. Material which is carried by the blades 18 past the strike-off bar 19 is then allowed to drop to the surface where it is to be placed.

Figure 3:
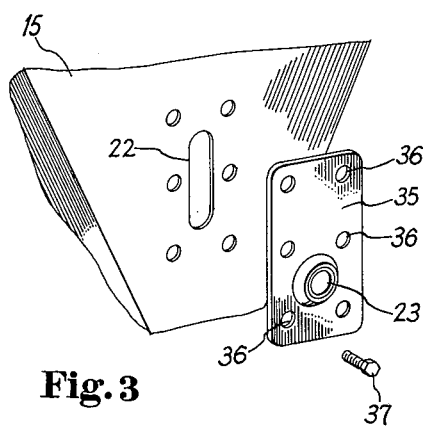
FIGURE 3 is a perspective view showing a portion of the side of my spreading mechanism with the bearing plate exploded therefrom.

Immediately above and in parallel alignment with the metering shaft, I provide a vibrating tube 20. In the particular embodiment shown, the tube is square in cross-section, and it is provided with a solid stub shaft 21 extending out each end. Referring for a moment to FIG. 3, it will be understood that each of the shafts 21 extends through a slot 22 in the adjacent hopper end wall 15 and is journaled in a bearing 23. This construction will be described in more detail hereinafter.

As shown in FIG. 4, the vibrating tube 20 is so positioned that its lowermost edge will be struck by the blades on the metering shaft. It will be apparent that the tube will be normally struck or vibrated eight times during each revolution of the metering shaft. For example, if the metering shaft is rotating at 300 r.p.m., this will produce 2400 vibrations per minute in the tube 20.

To transmit these vibrations throughout the supply of material carried in the hopper, I provide sets of ears 24 extending at spaced intervals along the length of the vibrating tube. These pivotally receive the lowermost end of spring-like resilient arms 25 which are pivotally secured at their outer ends to the lugs 26 fixedly secured to the inner surface of the hopper walls 13 and 14. As mentioned before, these arms 25 transmit the vibrations of the tube 21 throughout the load of material to be spread, for the purposes of (a) offering assistance to the flow of gravity, by breaking any caking or bridging of material in the hopper, and (b) fluffing the material in the hopper to a more uniform state in which it can be readily metered.

The arms 25 serve an additional function, which will now be described. As the tube 21 is struck by the blades 18 of the metering shaft, it will be rotated slightly in a clockwise direction (when viewed as in FIG. 4); and the arms serve to quickly return the vibrating tube 20 back to its center position so that it may be struck by the next passing blade 18. Thus it will be seen that the arms 25 are alternately bowed and straightened, and this flexing action continuously agitates or fluffs the material being spread.

I also have found it desirable to provide an inverted V support plate 27 which overlies the full length of the vibrating tube 20. This support plate serves the twofold purpose of relieving the full load pressure from the spreader mechanism, and creates a void to allow for expansion of material when it is fluffed by the vibrating shaft and arms.

When spreading material over a given surface, the amount deposited per linear foot may be determined from the following formula:

$$\frac{\text{pounds of material per revolution of metering shaft} \times \text{r.p.m. of metering shaft}}{\text{feet per minute covered}} = \text{pounds per linear foot}$$

It is a further advantage of my machine that each of the three factors of this formula may be controlled independently as will now be described.

The pounds of material deposited per revolution of the metering shaft is, in the first instance, of course, determined by the diameter of the shaft 16 and the size of the blades 18. During the course of operations, however, this factor may to some degree be controlled by the position of the strike-off bar 19. In other words, there is a certain minimum volume; but as the strike-off bar is moved away from the outer edges of blades 18 of the metering shaft, the amount of material which is allowed to pass is correspondingly greater. To this end, I provide the mechanism indicated in FIG. 2. As will be seen therein, an arm 28 is pivotally mounted at 29 to the end wall 15 of the hopper. The lower end of the arm 28 is connected through the turnbuckle assembly 30 to the wall 13 of the hopper. In this embodiment, it will of course be necessary that a portion of the wall 13 be hingedly mounted, as shown at 31 to form a movable gate 13a. The other end of the arm 28 is connected to the piston of a fluid actuated cylinder 32. As should by now be obvious, the purpose of this arrangement is to swing the gate 13a along with the strike-off bar 19 away from the blades 18 on the metering shaft. In such a case, the metering shaft performs no real metering function, but acts solely as an impeller to keep the material moving freely. A secondary adjustment of this gate assembly is available by means of the turnbuckle assembly 30.

This feature of adjustability greatly adds to the usefulness of my invention. It will be evident that in its closed position, the spreader will not meter relatively coarse materials. However, it should be equally apparent that with the gate in an open position, such coarse materials can readily be spread. Furthermore, the gate 13a can be opened all the way, in which case the contents of the hopper will be dumped in its entirety; in this manner, the spreader of my invention can carry out ordinary hauling operations, when it is not necessary to perform the spreading function.

The revolutions per minutes of the metering shaft is of course, controlled by the power source. Referring to the preferred embodiment of my invention as shown in FIG. 1, it will be seen that the independent motor 33 and the driving arrangement 34, serve to drive the metering shaft. When the power source is independent of the prime mover as in this instance, any conventional means can be used to vary the speed of rotation of the metering shaft. It would be possible, on the other hand, to drive the metering shaft directly from the wheels or axle of the vehicle itself, in which case its revolutions per minute would be a constant in relation to the speed of the vehicle.

The feet per minute covered is of course determined solely by the speed of the prime mover.

By virtue of the independent control over the three variables in the spreading formula, the spreader of my invention is capable of extreme accuracy in metering the precise quantity of material desired, and hence results in great economies, both in material and labor, and in increased speed of operations.

The construction shown in FIGURE 3 is a refinement of my invention to adapt it for better handling of heavy coarse materials such as lime rock or gravel for a road base. As noted earlier in this specification, the shaft 21 at each end of the vibrating tube extends through the slot 22 in the end of the hopper and is journaled in the bearing 23. It will now be noted that the bearing 23 is formed near one end of a rectangular plate 35, which is provided with a plurality of openings 36. To adapt my spreader for the handling of such larger materials, the fastenings 37 (screws, bolts, and the like) are removed, and the plate 35 is inverted, thereby moving the shaft 21 and the vibrating bar 20 upwardly to a position near the top of the slot 22. This will mean that the vibrating tube is now positioned approximately 3 inches above the top of the rotating blades 18. It will be understood, however, that material impelled by the blades 18 will strike the vibrating tube 20 so that even in this "up" position, the vibrating mechanism will perform its intended function.

It should by now be apparent that numerous modifications involving my invention are possible. For example, the system may readily be adapted for the spreading of a combination of materials, such as liquid asphalt and cover materials, as in the surface treatment, or sand sealing operations. Notice that in FIG. 1, a liquid metering device 38 is shown as mounted on the trailer just ahead of the hopper.

When this spreader is combined with spinners of conventional manufacture, the material can be broadcast to extra wide widths. Such a modification would be highly desirable for ice control work, in which salt or sand could be spread over the full width of a highway, with the prime mover travelling at a normal highway speed. This same principle could be utilized in field fertilizing and for spreading seed over a large area.

Similarly, the discharge opening may be provided with one or more baffles which effectively serve to limit the width of the opening, thereby permitting spreading of materials in relatively narrow strips.

It must therefore be understood that while I have described my invention in terms of a particular embodiment, no limitation is intended other than as set forth in the following claims. Similarly, in using the term "pulverulent materials" to characterize the substances handled by the spreading device, most of which are of powdery character, it is to be understood that the utility of the spreader is not limited to powdered materials in that coarser materials can be readily handled.

What I claim as new, and desire to secure by Letters Patent is:

1. A spreading device for pulverulent materials comprising a hopper having a discharge opening, metering means in communication with said discharge opening, said metering means comprising a shaft rotatably journaled in said hopper and disposed in said discharge opening, a plurality of blades extending the full length of said shaft and projecting radially outwardly therefrom, said blades being spaced circumferentially about said shaft an equal distance apart, means for rotating said shaft and blades, a vibrating bar mounted for rotational movement in said hopper immediately above and in parallel contacting relationship to said metering means, resilient means operatively connected to said vibrating bar for agitating the pulverulent material in said hopper, said resilient means comprising a plurality of resilient arms pivotally connected at one end to said vibrating bar, the other ends of said arms being pivotally connected to said hopper, a gate hingedly connected to said hopper with one edge of said gate forming one boundary of the discharge opening in said hopper, said gate being movable from a closed to open position, means for opening and closing said gate, and a strike-off bar mounted on the edge of said gate forming a boundary of said discharge opening, said strike-off bar being substantially tangent to the path of rotation of said blades when said gate is in the closed position, and spaced therefrom when said gate is opened.

2. A spreading device for pulverulent materials comprising a hopper having a discharge opening, metering means in communication with said discharge opening, said metering means comprising a shaft rotatably journaled in said hopper and disposed in said discharge opening, a plurality of blades extending the full length of said shaft and projecting radially outwardly therefrom, said blades being spaced circumferentially about said shaft an equal distance apart, means for rotating said shaft and blades, a vibrating bar mounted for rotational movement in said hopper immediately above and in parallel relationship to said metering means, resilient means operatively connected to said vibrating bar for agitating the pulverulent material in said hopper, said resilient means comprising a plurality of resilient arms pivotally connected at one end to said vibrating bar, the other ends of said arms being pivotally connected to said hopper, said vibrating bar being movable from a first position contacting said metering means to a second position spaced upwardly from said first position and out of contact with said metering means, means for moving said vibrating bar from said first position to said second position without disconnecting said resilient arms, a gate in said hopper, one edge of said gate forming one boundary of the discharge opening in said hopper, said gate being movable from a closed position to an open position, means for opening and closing said gate, and a strike-off bar mounted on the edge of said gate forming a boundary of said discharge opening, said strike-off bar being substantially tangent to said path rotation of said blades when said gate is in the closed position, and spaced therefrom when said gate is opened.

3. A spreading device for pulverulent materials comprising a hopper having a discharge opening, metering means in communication with said discharge opening, said metering means comprising a shaft rotatably journaled in said hopper and disposed in said discharge opening, a plurality of blades extending the full length of said shaft and projecting radially outwardly therefrom, said blades being spaced circumferentially about said shaft an equal distance apart, means for rotating said shaft and blades, a vibrating bar mounted for rotational movement in said hopper immediately above and in parallel relationship to said metering means, said vibrating bar comprising an elongated tube which is essentially square in cross-section, a shaft mounted in each end of said tube, said shafts extending outwardly in axial alignment with said tube, said shafts being journaled in said hopper for rotational movement relative to said hopper, resilient means operatively connected to said vibrating bar, said resilient means comprising a plurality of resilient arms pivotally connected at one end of said vibrating bar, the other ends of said arms being pivotally connected to said hopper, whereby said resilient arms constrain said tube against rotation and are alternately compressed and extended to agitate the pulverulent material in said hopper, said vibrating bar being movable from a first position contacting said metering means to a second position spaced vertically upwardly from said first position and out of contact with said metering means, means for moving said vibrating bar from said first position to said second position without disconnecting said resilient arms, a gate hingedly connected to said hopper, one edge of said gate forming one boundary of the discharge opening in said hopper, said gate being movable from a closed position to an open position, means for opening and closing said gate, and a strike-off bar mounted on the edge of said gate forming a boundary of said discharge opening, said strike-off bar being substantially tangent to the path of rotation of said blades when said gate is in the closed position, and spaced therefrom when the gate is opened.

4. A spreading device for pulverulent materials comprising a hopper having a discharge opening, metering means in communication with said discharge opening, said metering means comprising a shaft rotatably journaled in said hopper and disposed in said discharge opening, a plurality of blades extending the full length of said shaft and projecting radially outwardly therefrom, said blades being spaced circumferentially about said shaft a substantially equal distance apart, means for rotating said shaft and blades, a vibrating bar mounted for rotational movement in said hopper immediately above and in parallel relationship to said metering means, and resilient means operatively connected to said vibrating bar for agitating the pulverulent material in said hopper, said resilient means comprising a plurality of resilient arms pivotally connected at one end to said vibrating bar at spaced apart intervals throughout the length thereof, the opposite ends of said arms being pivotally connected to said hopper at spaced apart points so that said arms lie in generally parallel relationship to each other.

5. The device claimed in claim 4 wherein said vibrating bar is vertically adjustable from a lowermost position in which said bar is positioned to be contacted by the blades of said metering means to an elevated position in which said bar is out of contact with said metering means but positioned to be contacted by material carried by said metering means as it is rotated, and means for moving said vibrating bar from the lowermost to the elevated position.

6. The device claimed in claim 5 including a support plate in said hopper overlying the full length of said vibrating bar, said support plate being of inverted V-shape in cross-section.

References Cited in the file of this patent
UNITED STATES PATENTS

| | | |
|---|---|---|
| 260,047 | Shroke | July 16, 1878 |
| 1,783,092 | Lewis | Nov. 25, 1930 |
| 1,791,752 | Cross | Feb. 10, 1931 |
| 2,123,318 | Taylor | July 12, 1938 |
| 2,178,320 | Bogumill | Oct. 31, 1939 |
| 2,355,728 | Hyland | Aug. 15, 1944 |
| 2,593,516 | Alley et al. | Apr. 22, 1952 |
| 2,710,117 | Fritz | June 7, 1955 |
| 2,784,881 | Hines et al. | Mar. 12, 1957 |
| 2,796,202 | Lawrence et al. | June 18, 1957 |